(12) United States Patent
Southam et al.

(10) Patent No.: US 6,920,410 B2
(45) Date of Patent: Jul. 19, 2005

(54) SYSTEMS AND METHODS FOR TESTING A NETWORK SERVICE

(75) Inventors: Blaine R. Southam, Windsor, CO (US); David Christopher Davidson, Windsor, CO (US); Jay D. Knitter, Wellington, CO (US); Donna J. Grush, Fort Collins, CO (US); Terry M. Martin, Fort Collins, CO (US); Mark L. Sabiers, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 56 days.

(21) Appl. No.: 10/614,938

(22) Filed: Jul. 8, 2003

(65) Prior Publication Data

US 2005/0021276 A1 Jan. 27, 2005

(51) Int. Cl.$^7$ ............................................. G06F 19/00
(52) U.S. Cl. ........................ 702/122; 702/108; 702/182; 702/189; 370/235; 370/249; 379/29.02; 703/23; 703/26; 709/250; 709/223; 700/39
(58) Field of Search ........................... 702/108, 122, 702/182, 189; 370/235, 249; 379/29.02; 703/23, 26; 709/250, 223; 700/39

(56) References Cited

U.S. PATENT DOCUMENTS 5,809,286 A  *  9/1998  McLain et al. ............... 703/23
2003/0088707 A1  *  5/2003  Barnhouse et al. ......... 709/313

OTHER PUBLICATIONS

Wolfe Jr., 'Baseband Emulators for the Protocol Testing of Multimedia Communication Networks', Nov. 1998, IEEE Network, pp. 8–14.*
Mason, 'Ensuring Network Integrity', Jan. 1997, IEEE Article, pp. 1–7.*
Zheng et al., 'Test Evaluation of Wide Area Networks Using Emulator Cluster', May 2003, IEEE Article, pp. 281–285.*

* cited by examiner

Primary Examiner—Marc S. Hoff
Assistant Examiner—Elias Desta

(57) ABSTRACT

Disclosed are systems and methods for testing a network service. In one embodiment, a system and a method pertain to sending an initial request to the network service, redirecting a related request sent by the network service to an actual network service such that the related request does not reach the actual network service, emulating operation of the actual network service, and returning at least one response to the network service being tested, the at least one response being responsive to the related request.

26 Claims, 8 Drawing Sheets

SYSTEMS AND METHODS FOR TESTING A NETWORK SERVICE

BACKGROUND

Network services, such as "web" services, are network-based applications that operate in a distributed computing environment to perform specific tasks in response to client requests. Currently, most such web services are focused on providing a variety of real world services, or information about such services, across the Internet.

For an example, a given web service may be designed to identify the cheapest long distance rates for a given client. In this case, the client may provide various information to the web service such as a client identity, a city and state of residence, which are an indication of typical calling patterns, where the web service will use the information to identify a service provider and/or calling plan that would cost the least for the client based upon the client-provided information. In making the determination as to which service provider and/or calling plan is best for the client, the web service may leverage the resources of one or more other web services, for instance the client may be hosted by one or more long distance service providers (e.g., AT&T™, Sprint™, MCI™,) etc. Specifically, the web service that was called upon by the client may return the best provider/plan for the client relative to other web service providers which offers collected information from those services that is needed to help the client make the provider/plan determination.

During development of such a web service, the web service must be tested to ensure that, once deployed on a network (e.g., the Internet), it will work in the manner intended by the developer. Although such testing could be conducted by actually operating the web service live in the intended operating environment (e.g., the Internet), it is undesirable to do so in that if third party web services are called by the web service under development, charges may be unintentionally incurred (e.g., for initiation of long distance services or for service usage fees). Furthermore, the hosts of the third party web services may become irritated with such "false" requests, particularly if many such requests are made of the third party web services during testing.

Although the underlying code of a web service under development could be rewritten to call web services created for test purposes and controlled by the developer, such a testing solution is disadvantageous. In such a case, the web service code must be modified to conduct the testing, and then modified again once testing has been completed to return the code to its original state (i.e., the code is configured to interact with actual web services in the intended operating environment). Such modification is both time-consuming and expensive. Moreover, given that mistakes can be made in modifying the code after testing is completed, it is possible that glitches or "bugs" may exist in the code at the time of deployment despite positive test results being observed.

As noted above it would be desirable to have a system and method for testing a web service in which the web service is tested in a substantially unmodified state and without the web service calling actual third party web services.

SUMMARY

Disclosed are systems and methods for testing a network service. In one embodiment, a system and a method pertain to sending an initial request to the network service, redirecting a related request sent by the network service to an actual network service such that the related request does not reach the actual network service, emulating operation of the actual network service, and returning at least one response to the network service being tested, the at least one response being responsive to the related request.

BRIEF DESCRIPTION OF THE DRAWINGS

The disclosed systems and methods can be better understood with reference to the following drawings. The components in the drawings are not necessarily to scale.

DETAILED DESCRIPTION

As described above, it is desired to test a network service, such as a web service, without having to modify the network service code and without having the network service actually interact with other network services that may, for example, be operated by third parties. As is described in this disclosure, a network service can be tested in an emulated operating environment by providing mock clients that submit requests to the network service and mock network services that provide information to the network service under test that is needed to respond to the mock client requests. In that the mock network services emulate the operation of actual network services, the actual network services need not be accessed by the network service under test.

As is further discussed below, a redirection service is used to redirect requests made by the network service under test of actual network services to one or more of the mock network services. Because of this redirection, the network service under test need not be modified to direct requests to the mock network services and may, therefore, remain hard-coded to interact with the actual network services. Because the mock network services are configured to emulate the responses of the actual network services, the network service under test is "unaware" that it is not really communicating with the actual network services. Accordingly, an accurate picture of how the network service under test would operate in the intended operating environment may be obtained.

Figure 1:
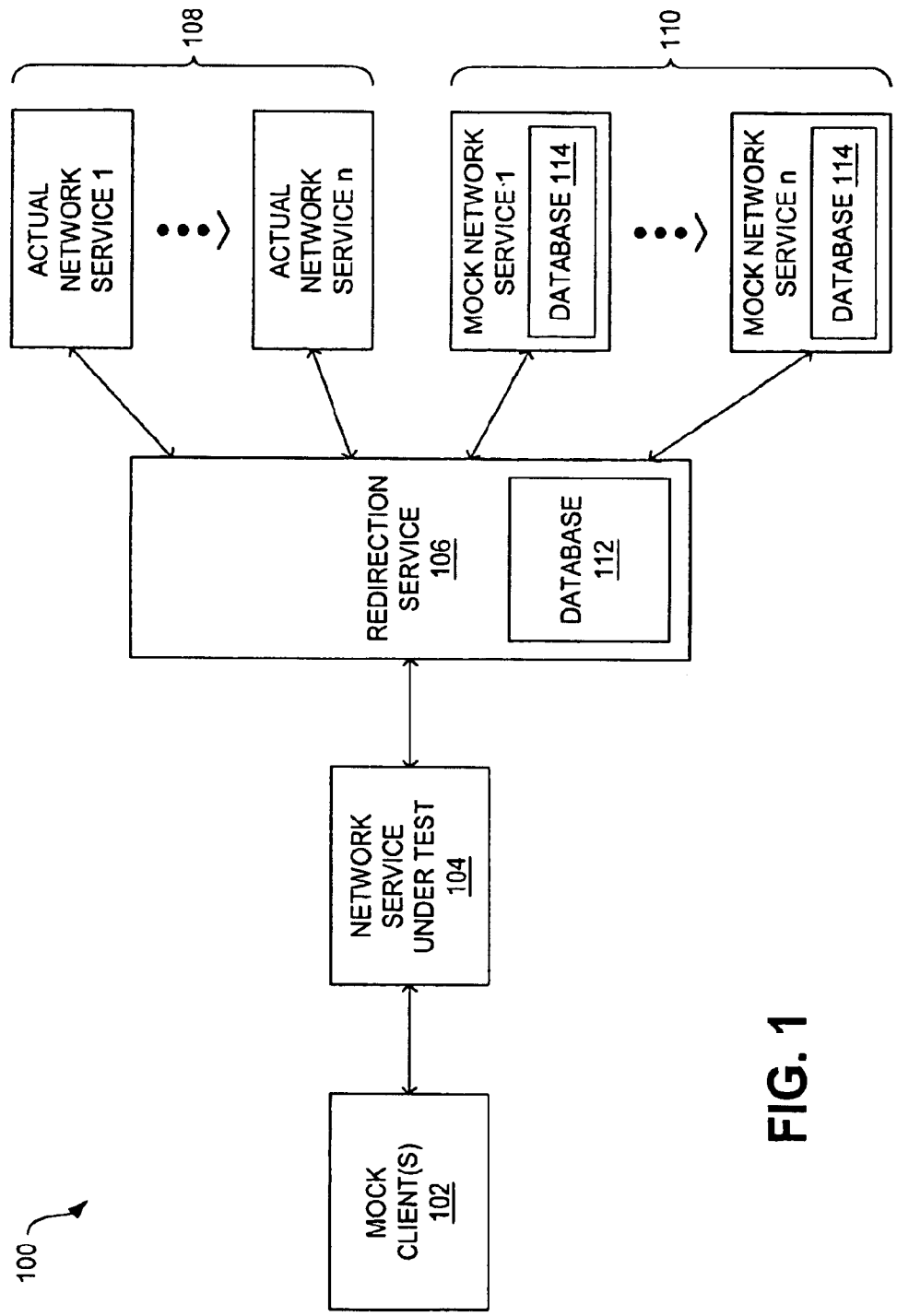
FIG. 1 is a schematic view of an embodiment of a system for testing a web

Referring now in more detail to the drawings, in which like numerals indicate corresponding parts throughout the several views, FIG. 1 illustrates an example system 100 for testing a network service, and may otherwise be referred to as the testing environment. As indicated in this figure, the system 100 generally comprises one or more mock clients 102, a network service under test 104, a redirection service 106, one or more actual network services 108, and one or more mock network services 110.

The one or more mock clients 102 represent clients that make requests of the network service under test 104 during the testing. These mock clients 102 comprise generic, data-driven code (i.e. the logic and functionality of the client is determined by an underlying database) and may comprise a network browser, such as a web browser that is configured to communicate on the World Wide Web (i.e. the "Web") via hypertext transfer protocol (HTTP) and hypertext markup language (HTML). Optionally; the mock clients 102 may comprise a client application comprising one or more user interfaces (UIs) that are used to collect information that is to be provided to the network service under test 104 to enable the service to respond to the request.

The network service under test 104, which for convenience will be referred to from this point forward as the "testee service," is the network service that is being tested within the testing environment 100. The testee service 104 may comprise a service that is configured for utilization on the Web and, therefore, may comprise a "web" service. Regardless, the testee service 104 is configured to both receive and supply content (i.e. static and/or dynamic content) over a network, such as the Internet. The testee service 104 is typically configured to use standard Web protocols such as HTTP, HTML, extensible markup language (XML), and simple object access protocol (SOAP). As is known in the art, SOAP is a remote procedure call (RPC) and document exchange protocol used to request and reply to messages between web services. By way of example, the requests sent by the testee service 104 comprise XML messages that are wrapped in SOAP envelopes and transmitted via HTTP.

The core functionality provided by the testee service 104 depends upon the particular implementation. In most embodiments, however, the testee service 104 is configured to communicate with other network services to satisfy requests made by client(s), including the mock client(s) 102. By way of example, the testee service 104 may comprise a service that identifies the least expensive telephone calling plan for the client, locates airline tickets that satisfy client-provided criteria (e.g., departure time, arrival time, cost, etc.), determines the most appropriate form of shipping based upon client requirements (e.g., airmail, next day delivery, etc.), identifies hotels that can accommodate a client itinerary, or the like.

As identified above, the testee service 104 may be configured (i.e. hard-coded) to interact with one or more actual network services 108. For the purposes of this disclosure, the term "actual network service" identifies a network (e.g., web) service that has been deployed for actual, normally public, use on a given network, such as the Internet. By way of example, the actual network services 108 comprise web services that are hosted by third parties, such as those parties that provide services that the client is seeking (e.g., telephone services, plane ticket reservations, shipping services, hotel accommodations, etc.). Such actual network services 108 may be contrasted with the mock network services 110 that, as is described in greater detail below, merely emulate the functionality of the actual network services and which are controlled by those conducting the network service testing.

To avoid unintended interaction between the testee service 104 and the actual network services 108 during testing, the redirection service 106 operates to redirect certain communications (i.e. requests) sent from the testee service and directed to one or more of the actual network services. In some embodiments, the redirection service 106 comprises, or is configured to access, a redirection database 112, such as a lookup table or other data structure, that maps network addresses (e.g., universal resource locators (URLs)) of various actual network services 108 to network addresses (e.g., URLs) of mock network services 110 that emulate the operation of those actual network services. Accordingly, requests sent out from the testee service 104 can be, if desired, rerouted to the network addresses of corresponding mock network services 110 by the redirection service 106. By way of example, the rerouted requests can be directed to SOAP-callable interfaces (e.g., stubs) of the mock network services 110.

Redirection is possible due to the fact that all traffic from the testee service 104 is routed through the redirection service 106. This is achieved by programming the underlying operating environment implemented in the test environment 100 to send all requests issued from the testee service 104 to the redirection service 106. In an embodiment in which the test environment 100 executes on top of a Java virtual machine (JVM), the JVM is configured to direct all traffic originating from the testee service 104 to the redirection service 106.

To illustrate how a request is redirected, assume, for example, that the testee service 104 transmits a request to one of the actual network services 108, and that the request is to be rerouted to one of the mock network services 110. The redirection service 106 identifies the intended destination address (e.g., URL) associated with the request and consults its database 112 (e.g., lookup table) to determine if a corresponding substitute address (e.g., URL) exists. If so, then the substitute address is written into the request in place of the intended destination address, and the request is then transmitted to the desired mock network service 110.

In cases in which no substitute address is included in the database 112, the request (or other communication) is forwarded to the intended destination address. Optionally, a user (e.g., test administrator) may activate or deactivate the rerouting function of the redirection service 106 for selected intended destination addresses. That is to say, when the rerouting function is active for an intended destination address, all requests sent to that address by the testee network service 104 are rerouted. However, if the rerouting function is inactive for the intended destination address, then all requests sent to that address by the testee service 104 are simply forwarded to the intended destination address.

The mock network services 110, like the mock clients 102, comprise generic, data-driven code. Therefore, the mock network services 110 do not actually comprise the business logic of the actual network services 108 that they emulate, and do not actually process requests as do the actual network services. Instead, the mock network services 110 merely receive inputs, in the form of requests, and transmit outputs, in the form of responses to the requests. As indicated in FIG. 1, each of the mock network services 110 includes, or may access, a database 114 (e.g., lookup table or other data structure) that defines the operation of the service. The database 114 of each service 110 maps a number of predefined requests to a corresponding number of pre-configured responses. When a mock network service 110 receives a request from the testee service 104 (via the redirection service 106), the received request is compared to information stored within the table or other data structure, and that information is mapped to one of the responses. The corresponding response is then transmitted to the testee service 104, for example, via the redirection service 106. The responses, like the requests, may comprise XML messages that are wrapped in a SOAP envelope and transmitted via HTTP.

As is apparent from the foregoing, all testee service requests and network service responses are typically routed through the redirection service 106. Assuming HTTP is employed, a socket may be opened in the redirection service 106 in transmitting a request to a mock network service 110. In such a case, the socket is closed when the response is received from the mock network service 110 and relayed back to the testee service 104. Alternatively, responses may be transmitted directly from a mock network service 110 to the testee service 104 in the event a protocol other than HTTP is employed, or if the execution of HTTP with respect to the redirection service 106 is altered. In such a case, a socket opened by the redirection service 106 in sending a request to a mock network service 110 is closed even though a response was never received therefrom.

Although not illustrated in FIG. 1, one or more of the mock client(s) 102, the testee service 104, the redirection service 106, and the mock network service(s) 110 can comprise independent or shared logs in which log entries may be stored that identify the data transmission activity (i.e. transmitting and receiving) of each system component. Furthermore, other operational occurrences, such as error conditions, can also be recorded in an associated log.

Example methods for creating the test environment 100 are described in U.S. patent application Ser. No. 10/449,555 entitled "Simulation of Network Service Test Environments", filed May 30, 2003, 2003, which is hereby incorporated by reference in its entirety into this disclosure. In the case in which the testee service 104 is a web service, the one or more mock network services 110 are created with reference to public interfaces, such as a web service description language (WSDL) files, which are available from the hosts of the actual network services (i.e. web services). These files provide the skeletal data structures of the actual network services 108 and therefore describe the interfaces of the actual network services. Specifically, the WSDL files identify the structure of the inputs or requests that the structure of the actual network services 108 may receive, and the output or responses that can be expected from those inputs.

Once the actual network service WSDL files have been obtained, a user can specify one or more mock network service WSDL files using a mock network service WSDL template. The mock network service WSDL files are then used as inputs to a test environment generation system. The number of mock network service WSDL files normally equals the number of mock network services 110 to be created, although one mock network service WSDL file may be employed in the creation of multiple mock network services.

The user (e.g., test administrator) manipulates a data entry mechanism associated with a test environment simulation system to input data associated with the test environment 100. In this respect, configuration data associated with the mock clients 102, the testee service 104, the redirection service 106 (e.g., database 112), and the mock network services 110 (e.g., database 114) is entered. Once all data necessary to create the various components of the test environment 100 is entered, the user then manipulates the test environment simulation system to generate and configure the test environment 100. In particular, the test environment generation system is executed to instantiate or otherwise generate one or more mock clients 102 that are placed in communication with the testee service 104. In cases in which the testee service 104 is a web service, the mock clients 102 are, for example, generated from the WSDL information associated with the testee service. The test environment generation system is also used to instantiate or otherwise generate the one or more mock network services 110 that are placed in communication with the testee service 104. Finally, the test environment generation system instantiates or otherwise generates the redirection service 106, and performs an automated configuration of the testee service 104 using configuration data entered by the user.

Figure 2:
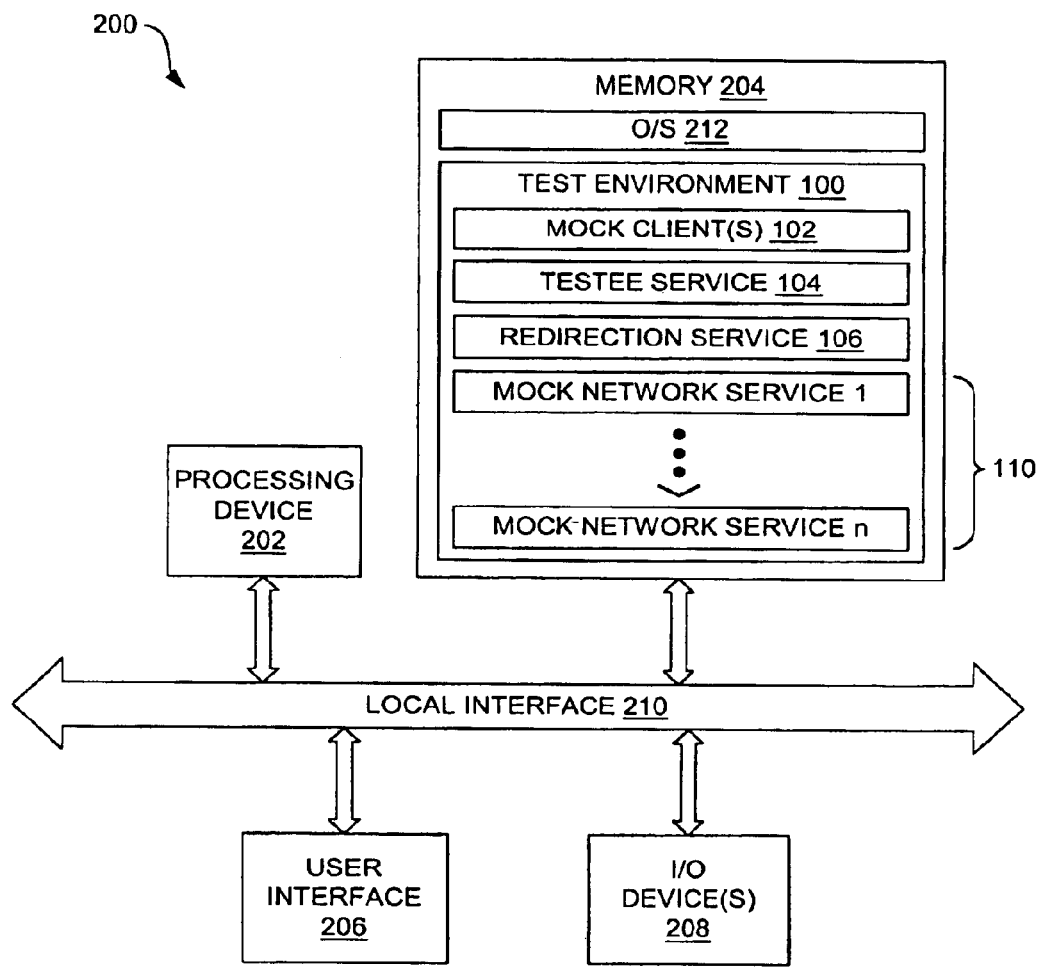
FIG. 2 is a block diagram of an embodiment of a computing device on which the system of FIG. 1 can execute.

FIG. 2 is a schematic view of an example architecture for a computing device 200 on which the test environment 100 can execute. As indicated in FIG. 2, the computing device 200 comprises a processing device 202, memory 204, a user interface 206, and one or more input/output (I/O) devices 208, each of which is connected to a local interface 210.

The processing device 202 can include a general-purpose processor, a microprocessor, one or more application-specific integrated circuits (ASICs), a plurality of suitably configured digital logic gates, or other electrical configurations comprised of discrete elements that coordinate the overall operation of the computing device 200.

The memory 204 includes any one of a combination of volatile memory elements (e.g., random access memory (RAM)) and nonvolatile memory elements (e.g., hard disk, read only memory (ROM), Flash memory, etc.).

The user interface 206 comprises the components with which a user can interact with the computing device 200. For example, where the computing device 200 comprises a personal computer (PC) or similar computer, these components can comprise, for instance, a keyboard, mouse, and a display.

With further reference to FIG. 2, the one or more I/O devices 208 comprise components that are adapted to facilitate connection of the computing device 200 to another device and may therefore include one or more serial, parallel, small computer system interface (SCSI), universal serial bus (USB), IEEE 1394 (e.g., Firewire™), or other communication components. In addition, the I/O devices 208 comprise the various components used to transmit and/or receive data over a network. By way of example, such components include one or more of a modulator/demodulator (e.g., modem); wireless (e.g., RF) transceiver, and/or a network card.

The memory 204 comprises various programs, in software and/or firmware, including an operating system (O/S) 212 and the test environment 100, which includes the mock client(s) 102, the testee service 104, the redirection service 106, and the mock network service(s) 108. The O/S 212 controls the execution of other software and provides scheduling, input-output control, file and data management, memory management, and communication control and related services. Optionally, the O/S 212 may incorporate or support a virtual machine, such as a JVM, on which the test environment 100 executes. The configuration and operation of the various components of the test environment 100 have been described above in relation to FIG. 1. Although each of those components is shown as executing on the computing device 200, one or more of those components can execute on one or more other computing devices (e.g., PC or server), if desired.

Various programs (i.e. logic) have been described herein. These programs can be stored on any computer-readable medium for use by or in connection with any computer-related system or method. In the context of this document, a "computer-readable medium" is any electronic, magnetic, optical, or other physical device or means that contains or stores a computer program for use by or in connection with a computer-related system or method. These programs can be used by or in connection with an instruction execution system, apparatus, or device, such as a computer-based system, processor-containing system, or other system that can fetch the instructions from the instruction execution system, apparatus, or device and execute the instructions.

Figure 3:
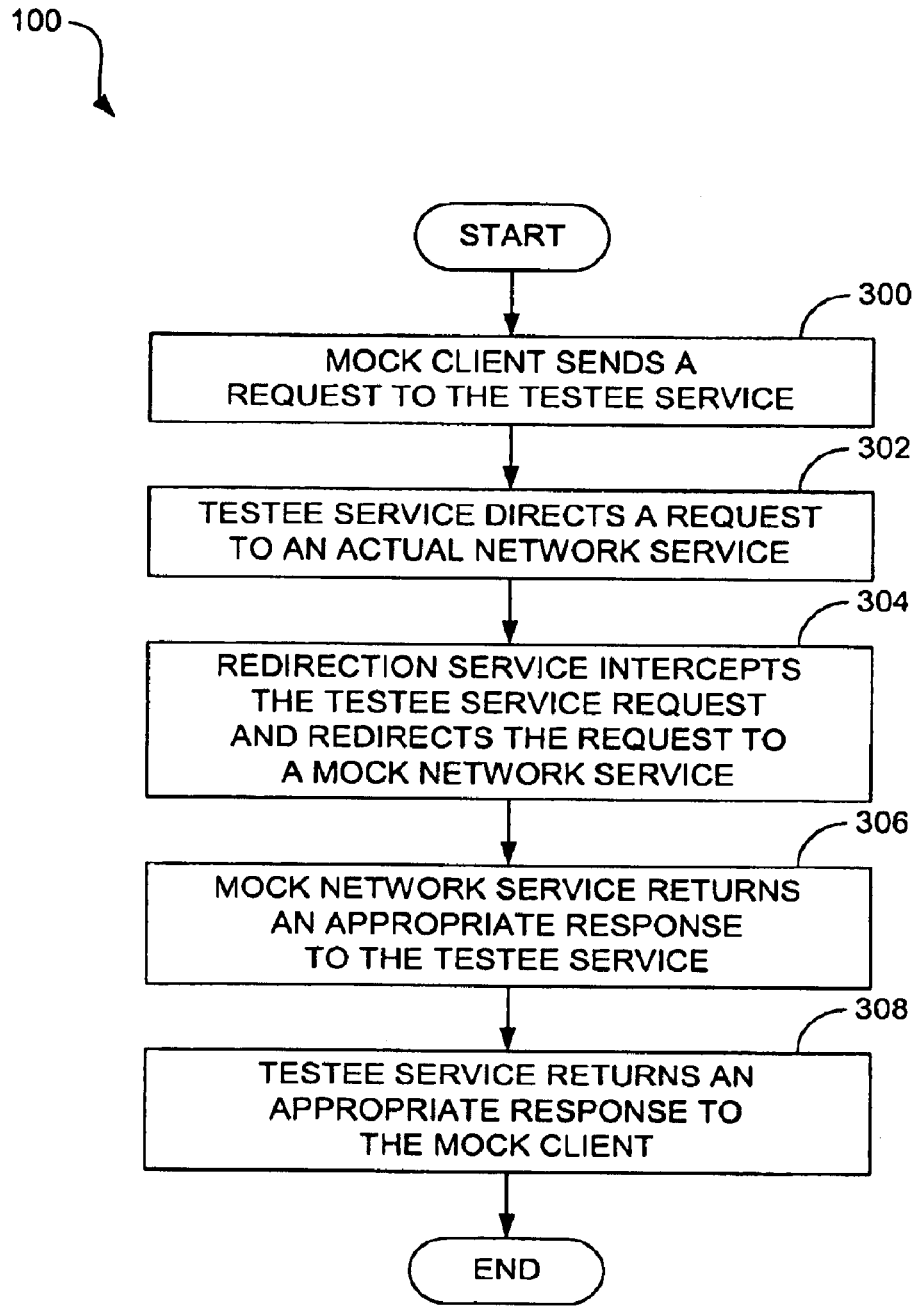
FIG. 3 is a flow diagram that illustrates an embodiment of a method for testing a web service.

Example systems having been described above, examples of system operation will now be discussed in relation to FIGS. 3–9. FIG. 3 is a flow diagram that-provides an overview of an example testing method, and FIGS. 4–6 and 8 are flow diagrams of examples of operation of the mock client 102, testee service 104, redirection service 106, and the mock network service 110, respectively. It is noted that process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

With reference first to FIG. 3, the mock client 102 sends a request to the testee service 104, as indicated in block 300. After the request is received, the testee service 104 directs a related request to an actual network service 108, as indicated in block 302. However, because of the presence and operation of the redirection service 106, the request is intercepted by the redirection service, and then redirected (rerouted) to a mock network service 110 that emulates operation of the actual network service 108 to which the testee service 104 attempted to send its request (block 304).

Because of the redirection, the mock network service 110 receives the testee service request and, as indicated in block 306, returns an appropriate response to the testee service 104. Once that response is received by the testee service 104, a separate response may then returned to the mock client 102, as indicated in block 308, to complete the flow for the request session.

Figure 4:
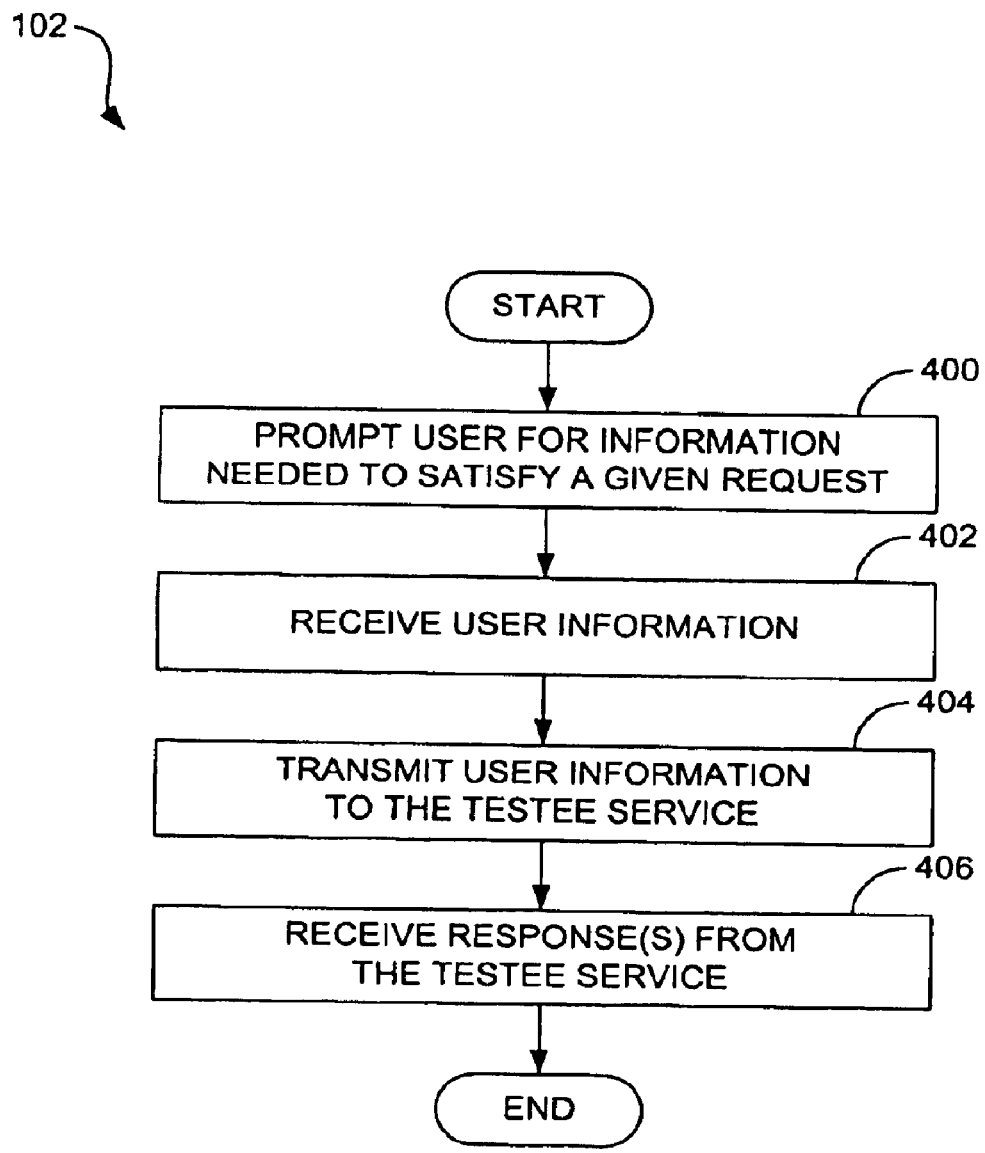
FIG. 4 is a flow diagram that illustrates an embodiment of operation of a mock client.

Referring next to FIG. 4, which describes an example of operation of a mock client 102, the mock client first prompts a user (e.g., test administrator) for information needed to satisfy a given request as indicated in block 400. The natured of the information prompted for depends upon the core functionality of the testee service 104. For example, if the testee service 104 is a web service that is configured to, based upon user input, determine the least expensive long distance provider and plan for that user, the testee service may prompt the user to provide his or her name, city and state of residence, and various information about the way in which the user currently makes long distance calls (i.e., the user calling pattern) including, for instance, what days the user normally uses long distance (e.g., weekdays versus weekends), what times the user normally uses long distance (e.g., daytime versus nighttime), the typical or average duration of the user's calls for each day and/or time, and the like.

In addition to the information for which the mock client 102 prompts, the manner in which the prompting is achieved may vary depending upon the given implementation. For example, in cases in which the mock client 102 comprises an application that executes on a user machine (e.g., PC), the mock client may prompt for the required information using one or more UIs in the form of one or more windows or screens that include several data input fields in which the information can be entered. In cases in which the mock client 102 comprises a network (e.g., web) browser, prompting may comprise displaying one or more network (e.g., web) pages to the user in the browser that, like the UIs, comprise data input fields in which information can be entered.

Irrespective of the information that is prompted for or the manner in which the prompting is achieved, the mock client 102 receives the user information, as indicated in block 402, and transmits the user information to the testee service 104, as indicated in block 404. By way of example, transmission may comprise packaging this information in an XML file that is wrapped in a SOAP message and transmitted to the testee service 104 via HTTP. The transmitted user information comprises the request that is provided to the testee service 104. For instance, in the long distance service example identified above, the request may comprise a request for the testee service 104 to determine, based upon the transmitted user information, what service provider and service plan would be best for the user from a cost perspective.

Figure 5:
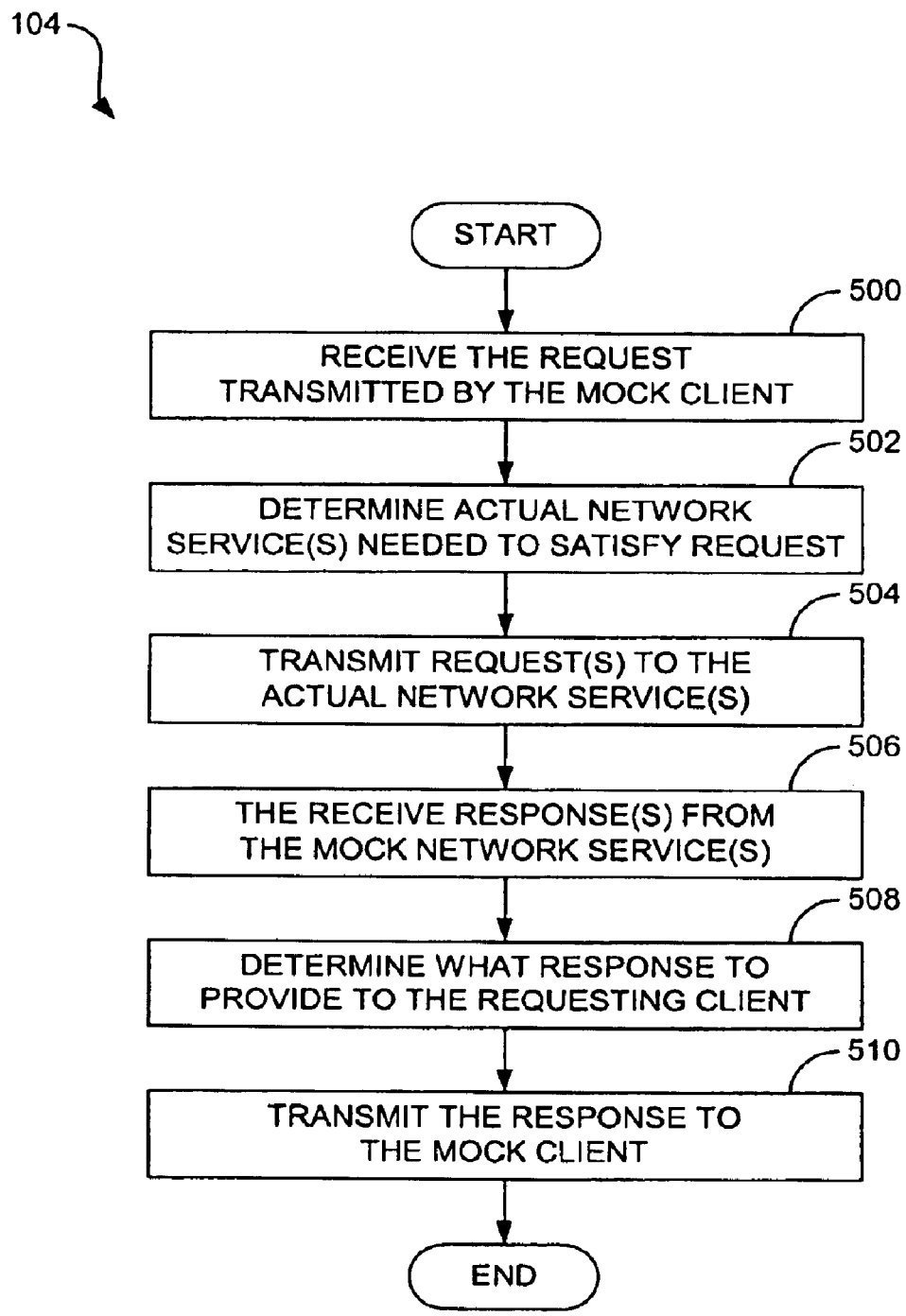
FIG. 5 is a flow diagram that illustrates an embodiment of operation of a network service under test.

Referring now to FIG. 5, which provides an example of operation of the testee service 104, the testee service receives the request that was transmitted by the mock client 102, as indicated in block 500. After receiving the request, the testee service determines what information is needed to respond to the request and, therefore, what actual network service or services 108 must be accessed to satisfy the request, as indicated in block 502. This determination depends upon the nature of the request. For instance, if the testee service 104 has been called upon to identify the cheapest long distance service for the user, the testee service may need to interact with network (e.g., web) services of each long distance provider that can provide service to the user.

Once the testee service 104 has determined each actual network service 108 in block 502, the testee service transmits a request to each such actual network service, as indicated in block 504. By way of example, each request again comprises an XML message that is wrapped in SOAP envelope and transmitted via HTTP. As described above, control is exercised over the testee service 104 in the test environment 100 such that requests are not actually submitted to actual network services. Instead, the requests are rerouted as described in greater detail in relation to FIG. 6.

Figure 6:
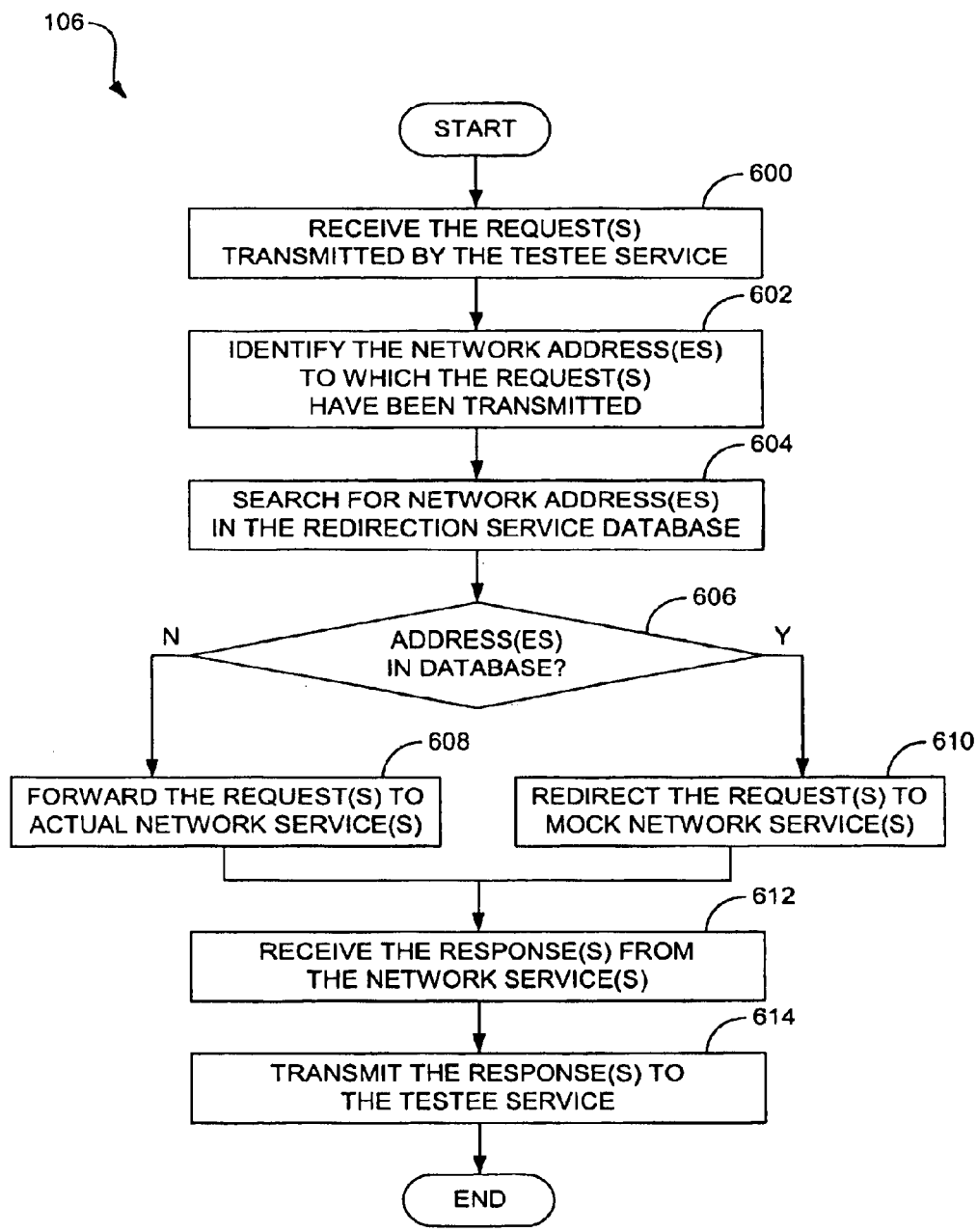
FIG. 6 is a flow diagram that illustrates an embodiment of operation of a redirecting service.

Referring now to FIG. 6, which provides an example of operation of the redirection service 106, the redirection service receives the request(s) transmitted by the testee service 104, as indicated in block 600. Next, with reference to block 602, the redirection service 106 identifies the network address or addresses to which the request(s) has/have been transmitted. By way of example, the redirection service 106 identifies one or more URLs that have been identified by the testee service 104. Because the testee service 104 is hard-coded to interact with actual network (e.g., web) services, the URL or URLs will pertain to one or more of the actual network services 108. Once the identification has been made, the redirection service 106 searches its database 112 (e.g., lookup table) to determine whether the identified network address(es) is/are contained therein, as indicated in block 604. If not, no associated mock network service 110 exists (or is available) and, therefore, no redirection is performed. If, on the other hand, one or more of the identified network addresses are contained in the database 112, redirection to a mock network service 110 is performed.

Figure 7:
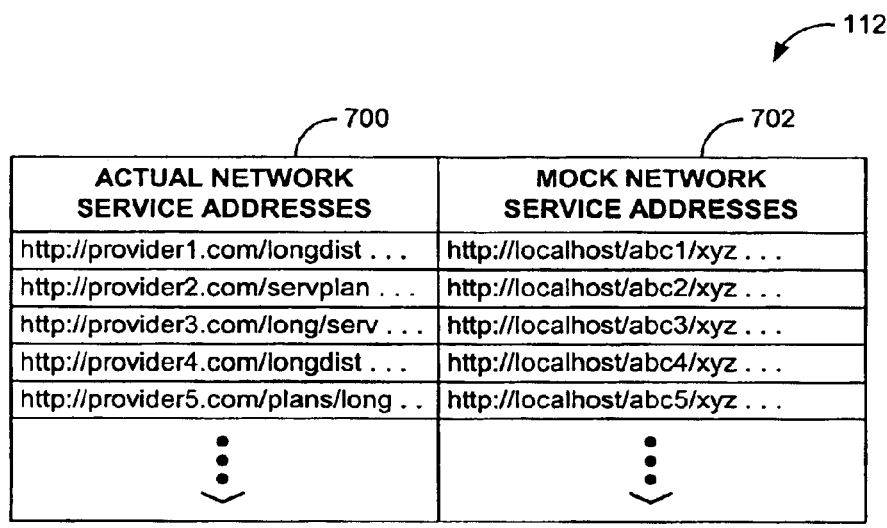
FIG. 7 is a schematic representation of a redirection service database.

FIG. 7 schematically represents and example database 112. As shown in this figure, the database 112 comprises a simple lookup table in which network address of various actual network services 108 are provided in one column 700, and the network addresses of various associated mock network services 110 are provided in another column 702. In the example of FIG. 7, a mock network service address is available for each actual network service address contained in the table.

With reference to decision block 606 of FIG. 6, if an identified network address is not in the database 112, flow continues to block 608 at which the redirection service 106 simply forwards the request(s) to the intended actual network service(s) 108 without performing any redirection. If, however an identified network address is contained in the database 112, the redirection service 106 redirects the request to an appropriate mock network service 110, as indicated in block 610. Specifically, the redirection service 106 writes a substitute network address into the request in place of the original network address so that the request or request is/are transmitted to one or more mock network services 110.

Figure 8:
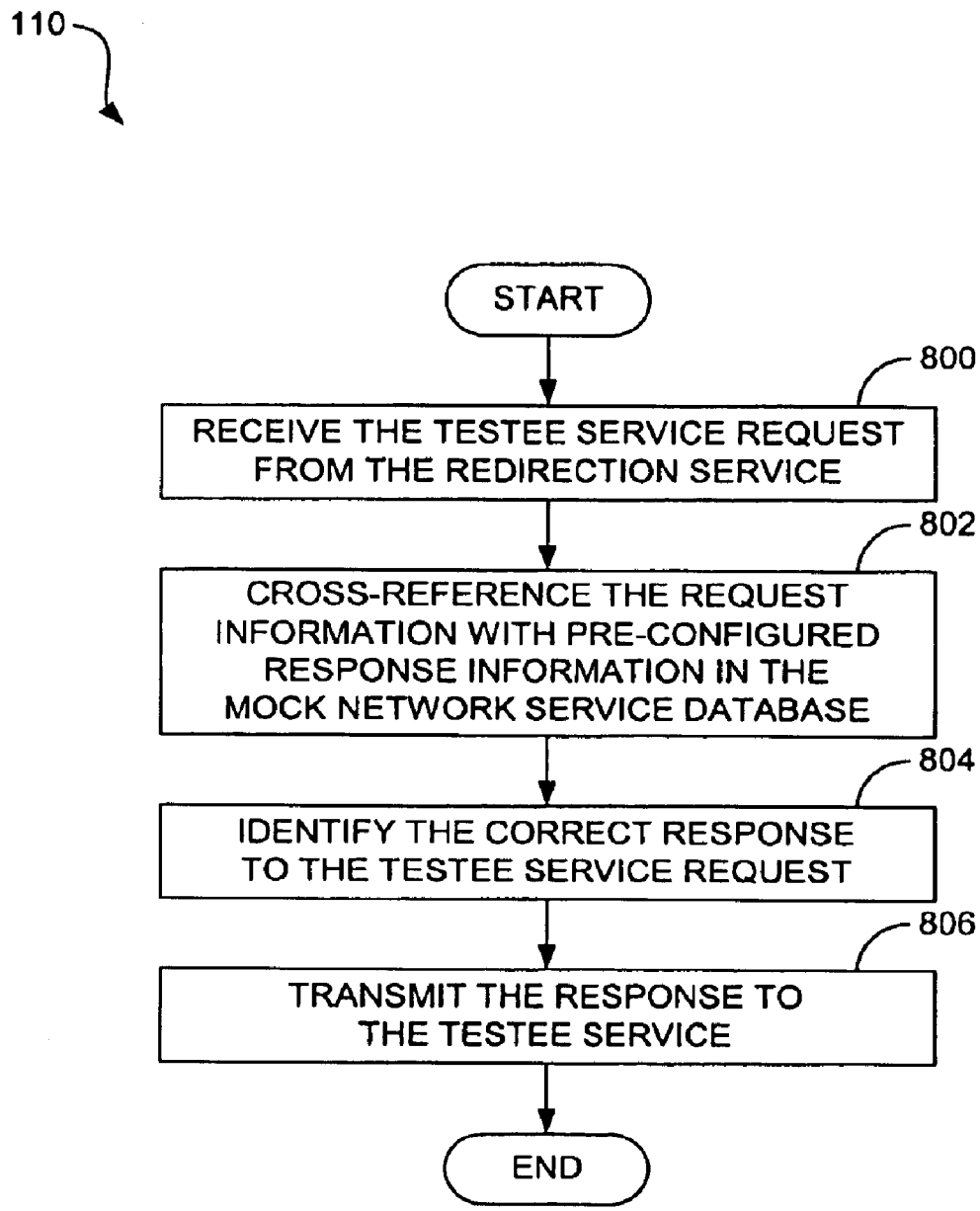
FIG. 8 is a flow diagram that illustrates an embodiment of operation of a mock network service.

Referring next to FIG. 8, which provides an example of operation of a mock network service 110, the mock network service receives the testee service request that has been redirected by the redirection service 106, as indicated in block 800. Once the request has been received, the mock network service 110 cross-references information contained in the request with pre-configured response information contained in the mock network service database 114, as indicated in block 802. For example, if the mock network service 110 is emulating a long distance service provider web service, the information provided in the testee service request (such as user residence and calling pattern information) is used as a key to identify response information (block 804) that would be returned by the emulated actual network service 108 had the information actually been provided to the actual network service.

Figure 9:
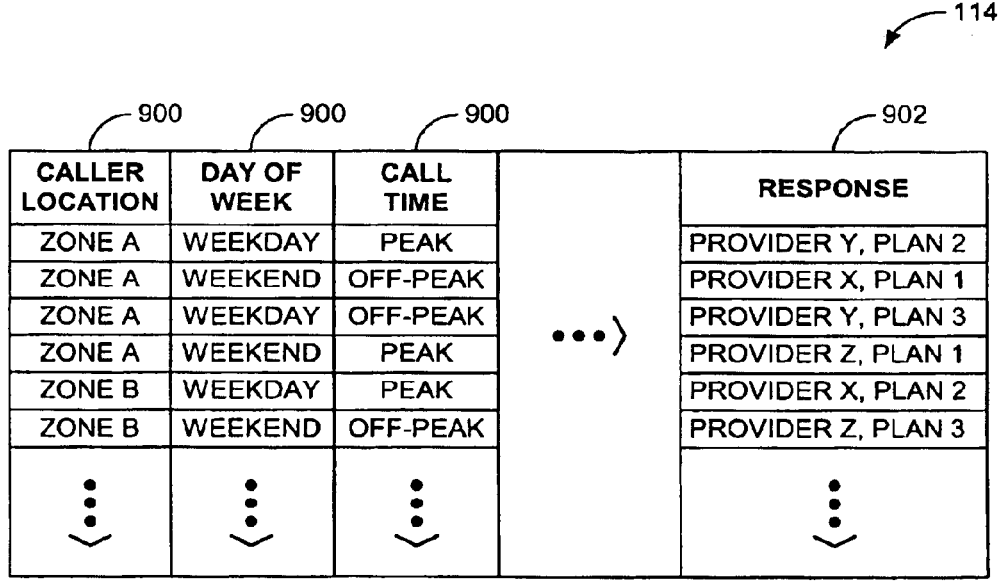
FIG. 9 is a schematic representation of a mock network service database.

FIG. 9 schematically represents an example mock network service database 114. As is illustrated in this figure, the database 114 can, like database 112, comprises a simple lookup table. In this case, however, predefined request information is contained in various input columns 900 and is used as the keys to identify the correct pre-configured response to the request in a response column 902. As is apparent from FIG. 9, multiple pieces of provided information may need to be combined to determine the correct response. For instance, if the user lives in "zone A" and is predominantly a "weekday" caller who normally places calls during "off-peak" hours, the most appropriate response to return in the example of FIG. 9 is a "plan 3" that is offered by a "provider Y." Notably, the table may be used to access further information that will be returned in the response. For instance, in the example described above, the "provider Y, plan 3" information obtained from the table may be used to identify one or more files that explain that plan and that is to be provided as a response.

Once the correct response has been identified by the mock network service 110, the service transmits a response, for instance a further XML message wrapped in a SOAP envelope, back to the testee service 104, as indicated in block 806, and flow is terminated for the mock network service for this request session.

Returning now to FIG. 6, the redirection service 106 receives one or more responses transmitted by one or more actual network services 108 and/or one or more mock network services 110, as indicated in block 612. The response(s) are then forwarded to the testee service 104, as indicated in block 614, and flow for the redirection service 106 is terminated for this request session.

Returning next to FIG. 5, the response(s) forwarded by the redirection service 106 are received by the testee service 104, as indicated in block 506. Once the response(s) have been received, the testee service 104 determines what response to provide to the requesting client (i.e., mock client 102), as indicated in block 508. This determination is made by the logic of the testee service 104 by using the information received in the response(s) as input. In the long distance service example, the determination may be a determination as to what one long distance service calling plan is best (e.g., cheapest) for the user given that user's particular situation (e.g., residence, calling patterns, etc.).

The testee service 104 then transmits the determined response to the mock client 102, as indicated in block 510, and flow for the testee service 104 is terminated for this request session.

Finally, with reference back to FIG. 4, the mock client 102 receives the response from the testee service 104, as indicated in block 406. At this point, flow for the mock client 102, as well as the request session as a whole, is terminated.

As can be appreciated from the above discussions, a network service can be effectively tested in the test environment 100 to determine whether the service operates as intended without having to modify the network service code and without interaction with other actual network services. By comparing the results obtained from the testing with those that are expected (e.g., in view of the WSDL files of the actual network services) an accurate picture of how the network service would operate in the intended operating environment is obtained.

What is claimed is:

1. A method for testing a network service, the method comprising:
    sending an initial request to the network service;
    redirecting a related request sent by the network service to an actual network service such that the related request does not reach the actual network service;
    emulating operation of the actual network service; and
    returning at least one response to the network service being tested, the at least one response being responsive to the related request.

2. The method of claim 1, wherein sending an initial request comprises sending a request to the network service being tested from a mock client.

3. The method of claim 1, wherein redirecting a related request comprises intercepting the related request and rerouting it to a mock network service.

4. The method of claim 3, wherein rerouting the related request comprises rerouting the related request by identifying a network address of the actual network service in a database and determining an associated network address of the mock network service.

5. The method of claim 1, wherein emulating operation of the actual network service comprises emulating operation of the actual network service using a mock network service.

6. The method of claim 5, wherein emulating operation of the actual network service using a mock network service comprises identifying request information in a database and determining a pre-configured response associated with the identified request information.

7. The method of claim 1, Further comprising prompting a user for information to be used to generate the initial request.

8. The method of claim 1, further comprising receiving a response generated by the network service being tested, the response being reflective of the at least one response returned to the network service being tested.

9. A system for testing network services, the system comprising:
- means for generating an initial request;
- means for determining what actual network services are needed satisfy the request;
- means for redirecting a related request sent by the means for determining such that the related request does not reach an actual network service;
- means for emulating operation of at least one network service; and
- means for returning at least one response to the means for determining, the at least one response being responsive to the related request.

10. The system of claim 9, wherein the means for generating comprise a mock client.

11. The system of claim 9, wherein the means for determining comprise the network service being tested.

12. The system of claim 9, wherein the means for redirecting the related request comprise a redirection service.

13. The system of claim 12, wherein the redirection service comprises a database that correlates network addresses of actual network services with network addresses of mock network services.

14. The system of claim 9, wherein the means for emulating comprise at least one mock network service.

15. The system of claim 14, wherein the at least mock network service comprises a database that correlates request information with pre-configured request responses.

16. A system for testing network services, the system comprising:
- a mock client that is configured to submit requests;
- a redirection service that is configured to redirect requests sent out by a network under test and directed at actual network services; and
- at least one mock network service that emulates operation of at least one actual network service, the at least one mock network service being configured to receive the requests that have been redirected by the redirection service.

17. The system of claim 16, wherein the mock client is further configured to prompt a user for information to generate a request.

18. The system of claim 17, wherein the mock client is configured to transmit the requests as extensible markup language (XML) messages that are wrapped in simple object access protocol (SOAP) envelopes.

19. The system of claim 16, wherein the redirection service comprises a database that correlates network addresses of actual network services with network addresses of mock network services.

20. The system of claim 16, wherein the at least one mock network service comprises a database that correlates request information with pre-configured request responses.

21. The system of claim 20, wherein the at least one mock network service is configured to transmit responses as extensible markup language (XML) messages that are wrapped in simple object access protocol (SOAP) envelopes.

22. A test environment stored on a computer-readable medium, the environment comprising:
- logic configured to generate an initial request;
- logic configured to determine what actual network services are needed satisfy the request and transmit a related request to an actual network service;
- logic configured to redirect the related request such that the related request does not reach the actual network service; and
- logic configured to emulate operation of the actual network service and return at least one response to the logic configured to transmit a related request, the at least one response being responsive to the related request.

23. The environment of claim 22, wherein the logic configured to generate an initial request comprises a mock client.

24. The environment of claim 22, wherein the logic configured to determine and transmit a related request comprises a network service being tested.

25. The environment of claim 22, wherein the logic configured to redirect the related request comprises a redirection service.

26. The environment of claim 22, wherein the logic configured to emulate an actual network service comprises a mock network service.

* * * * *